(No Model.) 2 Sheets—Sheet 1.
B. DETTRA.
MOTOR.
No. 389,290. Patented Sept. 11, 1888.
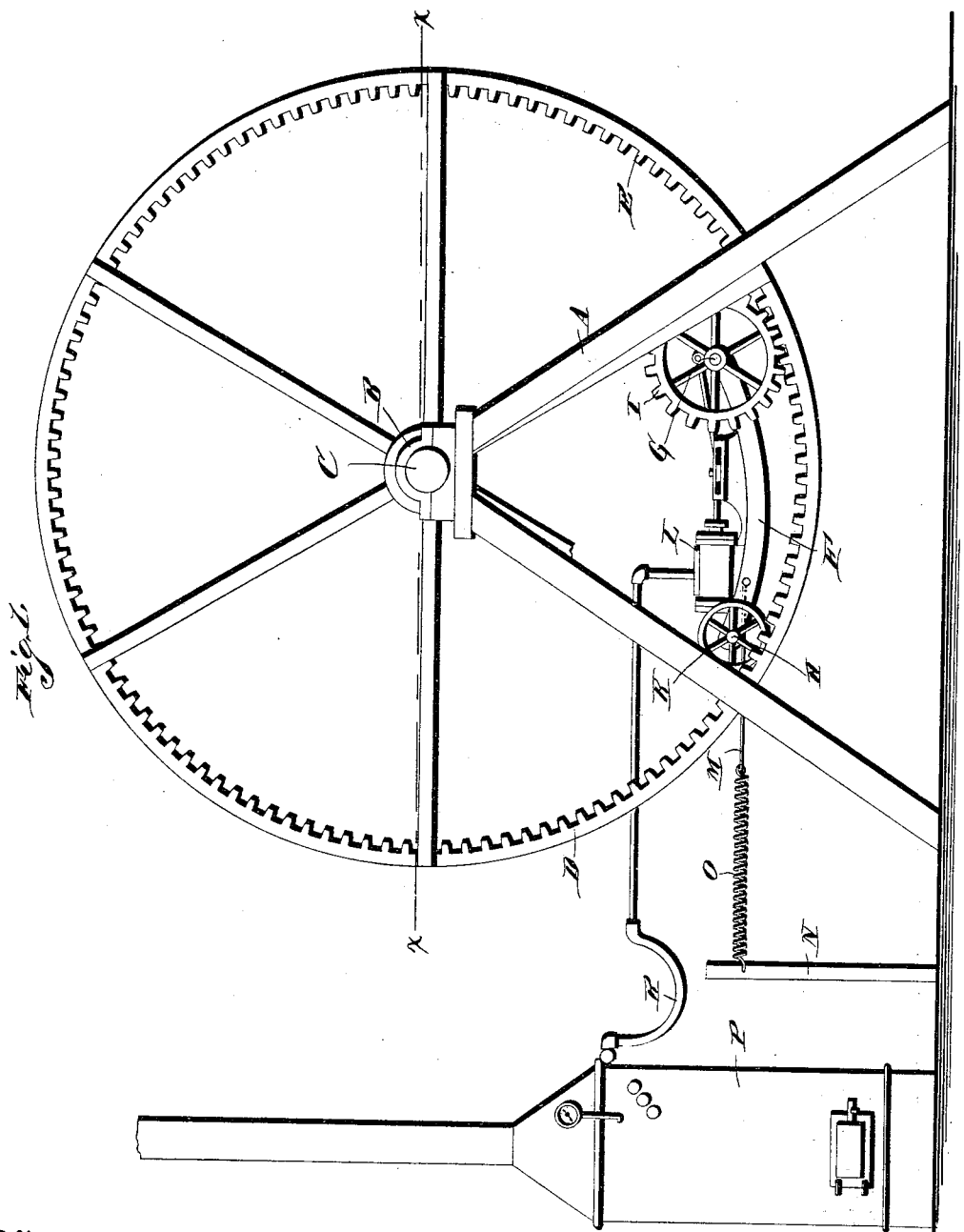
Witnesses
Inventor
Benjamin Dettra

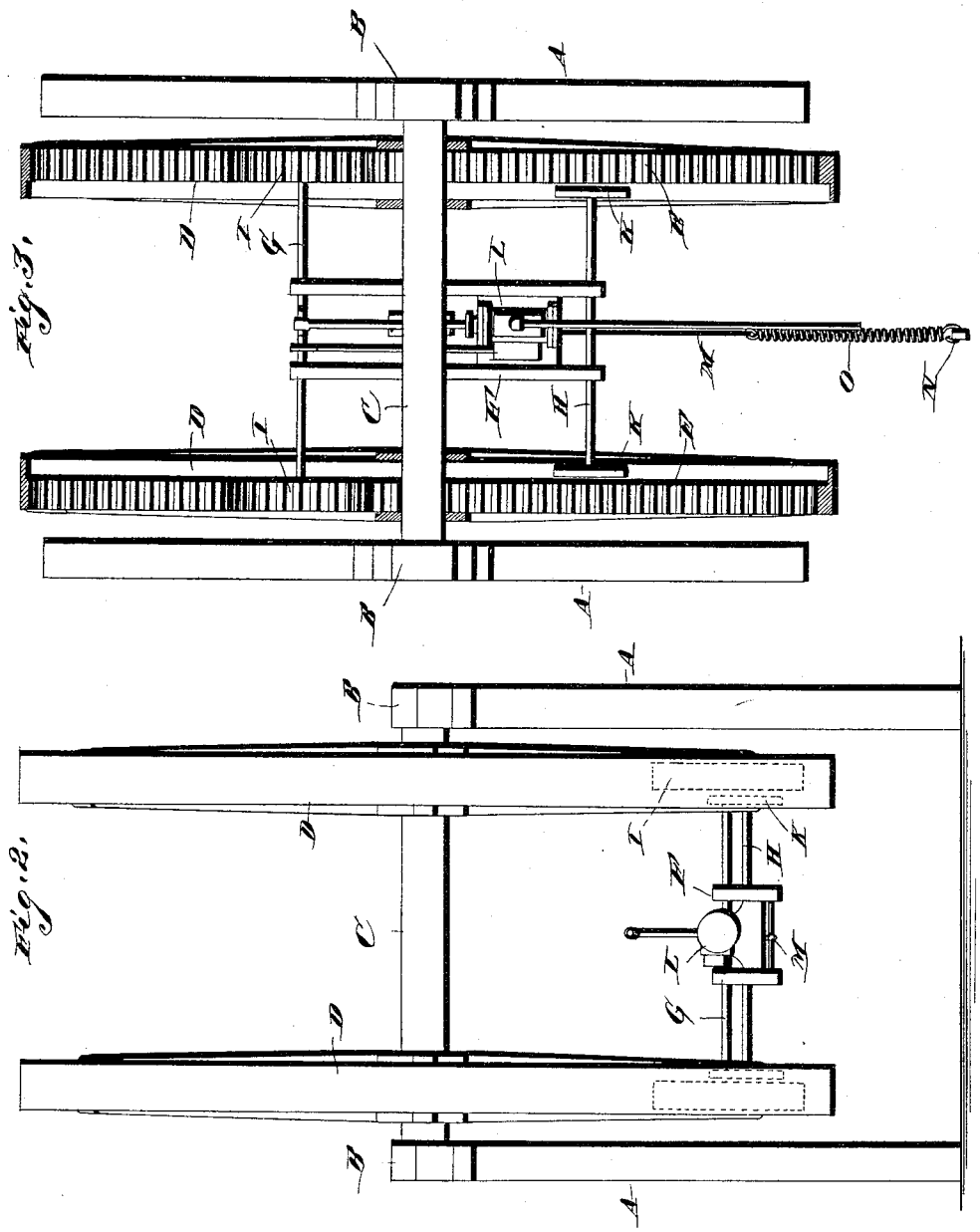

UNITED STATES PATENT OFFICE.

BENJAMIN DETTRA, OF RUSHVILLE, ILLINOIS.

MOTOR.

SPECIFICATION forming part of Letters Patent No. 389,290, dated September 11, 1888.

Application filed March 20, 1888. Serial No. 267,885. (No model.)

*To all whom it may concern:*

Be it known that I, BENJAMIN DETTRA, a citizen of the United States, residing at Rushville, in the county of Schuyler and State of Illinois, have invented a new and useful Improvement in Motors, of which the following is a specification.

My invention relates to an improvement in motors for driving stationary machinery of all kinds; and it consists in the peculiar construction and combination of devices, that will be more fully set forth hereinafter, and particularly pointed out in the claims.

In the accompanying drawings, Figure 1 is a side elevation of a motor embodying my improvements. Fig. 2 is an end elevation of the same. Fig. 3 is a horizontal section taken on the line $x\ x$ of Fig. 1.

A represents the pair of supports, which are arranged at a suitable distance apart, and are provided at their upper ends with bearings B.

C represents the main shaft, which is journaled in the bearings B, and is provided with a pair of large driving-wheels, D. The said wheels are arranged at a suitable distance apart and have their rims projecting inward from the spokes at right angles to the planes of the wheels, the said rims being further provided on their inner sides with cogs E.

F represents a carriage or frame, which is provided at its front end with a crank-shaft, G, and has the shaft H at its rear end. The crank-shaft is provided with cog-wheels I, which mesh with the cogged rims of the large driving-wheels, and the shaft H is provided with wheels K, which rest on the inwardly-projecting portions of the rims of the driving-wheels, and thereby support the engine.

L represents a reciprocating high-pressure steam-engine, which is secured on the frame or carriage F, is of the usual construction, and has its pitman connected to the crank-shaft G, whereby the said engine is adapted to rotate said crank-shaft, and its wheels I, being in engagement with the wheels D, cause said wheels D to rotate at a reduced rate of speed. The weight of the engine causes the same to remain in the lower side of the wheels D, so as to cause the engine to exert considerable traction on the said wheels D; and in order to prevent the engine from running up the inclined sides of said wheels D, I provide an anchor rope or chain, M, which is connected to a post or other suitable stationary object, N, and has a coiled retractile spring, O.

P represents a steam-boiler of suitable construction, which is connected to the steam-chest of the engine by means of a flexible pipe, R, the said pipe allowing the engine to play slightly in the lower sides of the wheel D.

Power is transmitted from the motor to the machinery to be driven by means of an endless belt, which may pass around one of the large wheels D, or may engage a pulley of reduced diameter on the shaft C.

My device is very simple and compactly arranged and by its use great power can be obtained from a small outlay of fuel and labor.

Having thus described my invention, I claim—

1. The combination of the tread-wheels D and the traveling engine supported by the tread-wheels, having driving-wheels engaging the inner sides of the rims of the tread-wheels, substantially as described.

2. The combination, with the tread-wheels having the internal cogs on their rims, of the engine mounted on the traveling carriage or frame, supported by the tread-wheels, and having the spurred driving-wheels engaging the spurs or cogs of the tread-wheels, substantially as described.

3. The combination of the tread-wheels, the engine mounted on a traveling carriage or frame and having the driving-wheels engaging the inner sides of the rims of the tread-wheels, and the anchor attached to the said traveling carriage and having the spring R, substantially as described.

4. The combination of the tread-wheels D, the engine mounted on a traveling frame or carriage and having the driving-wheels engaging the inner sides of the rims of the wheels, the boiler, and the flexible steam-supply pipe connecting the latter to the steam chest of the engine, substantially as described.

In testimony that I claim the foregoing as my own I have hereto affixed my signature in presence of two witnesses.

BENJAMIN DETTRA.

Witnesses:
J. R. KNAPP,
S. B. MONTGOMERY.